W. CHESTERMAN.
Coffee Pot.
No. 24,795.
Patented July 19, 1859.
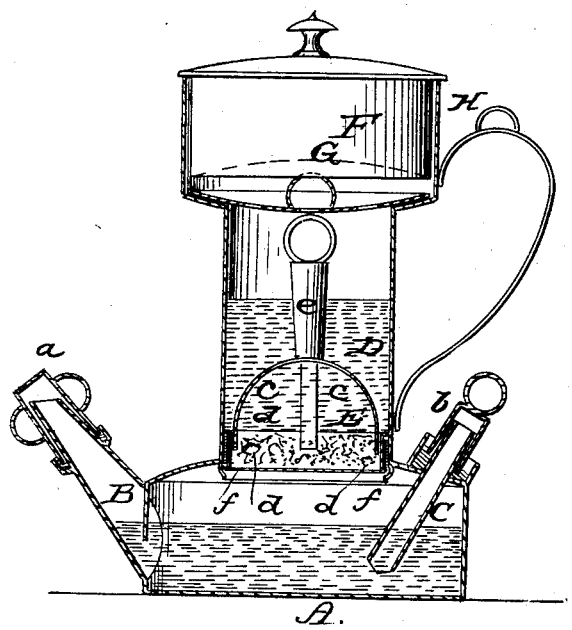
WITNESSES
INVENTOR

UNITED STATES PATENT OFFICE.

W. CHESTERMAN, OF CENTRALIA, IOWA.

COFFEE-POT.

Specification of Letters Patent No. 24,795, dated July 19, 1859.

*To all whom it may concern:*

Be it known that I, W. CHESTERMAN, of Centralia, in the county of Dubuque and State of Iowa, have invented a new and Improved Coffee-Pot; and I do hereby declare that the following is a full, clear, and exact description of the same, reference being had to the accompanying drawing, forming a part of this specification, which represents a vertical central section of a coffee-pot constructed according to my invention.

To enable those skilled in the art to fully understand, use and make my coffee pot I will proceed to describe its construction and operation.

A represents a flat vessel constructed of tin or any other suitable material usually employed for culinary vessels, and of various sizes according to taste and convenience and this vessel is provided with a spout, B, and with an air tube, C. Both the spout and the air tube are arranged in such a manner that when the required amount of water is poured into the pot, A, the lower openings of the same are closed and they are both covered with caps, *a* and *b*, which fit nicely over the same so as to prevent the air from getting into the pot.

Secured to the top of the vessel, A, is a cylindrical tube, D, which contains the strainer, E, and this strainer consists of a piece of flannel, *c*, drawn tightly over a metal ring, *d*, to which a handle, *e*, is secured, so that the strainer can be withdrawn. The ring, *d*, is provided with two lips, one above and the other below, which serve to retain a certain amount of packing which consists of hemp or cotton thread and which serves at the same time to retain the flannel, *c*. By these means the ring, *d*, is made to fit perfectly air tight into the cylindrical tube, D, which is provided with a projection, *f*, to prevent the strainer from being pushed down too low. The upper portion of the tube D enlarges again as clearly represented in the drawing so as to form a socket, H, for a condensing vessel, F, which is perfectly closed, and which contains nothing but air, and the size of this vessel is such that it contains surface enough to condense the vapors arising from the contents of the pot until the coffee is sufficiently boiled.

Below the vessel, F, and placed in the bottom of the socket, H, is the perforated plate, G, which serves to expose eggs or other similar substances to the heat of the vapor and steam arising from the contents of the vessel, so that those substances are ready cooked until the coffee boils.

The operation is as follows:—The strainer, E, is taken out and a portion of the water to be used is poured into the pot, A, enough to cover the inner openings of the air tube, C, and of the spout, B, and the caps, *a* and *b*, are put on their respective places perfectly tight. The strainer is now placed back into the tube, D, and a sufficient quantity of ground coffee is put into the same, and the pot is placed on a hot stove, or over a fire. As soon as the water contained in the same generates steam, which penetrates the ground coffee the rest of the water is poured in the tube, D, and the condensing vessel is placed in the socket, H. The steam rising from the water in the pot drives out all the air from the same and it heats the water contained in the tube, D, above the strainer, to the boiling point, and as soon as the vessel, F, becomes so hot that it is not able any longer to condense the vapor or steam rising from the tube, D, and as soon, therefore, as the steam escapes from the upper part of the socket, H, the coffee is ready and the pot is removed from the fire. Almost instantaneously with doing this the boiling stops, and a vacuum is formed in the pot, A, so that the atmospheric pressure forces the contents of the tube, D, down through the strainer into the pot, and the ground coffee is left nearly dry on the flannel, *c*. Not a particle of the flavor or aroma of the coffee can possibly escape as the vessel, F, condenses all the vapors, and as soon as the water in the tube, D, begins to boil, the coffee is ready. And at the same time all the strength of the coffee is extracted, as the steam from the water in the pot first passes up through the ground coffee and afterward the hot water contained in the tube, D, is drawn back through the same. And a very convenient feature of my coffee pot is the condensing vessel, E, which is made of such a size that as soon as the steam is seen to escape by its sides, the coffee is sufficiently boiled and ready for use. In order to pour it out the cap, *b*, is taken from the air tube, C, and the spout, B, is opened and the coffee can now be poured out quite readily, for by tipping the pot over toward the spout, the inner opening of the air tube is freed from water and the air can enter.

The strainer E, serves the double purpose of strainer and piston, being tightly packed. If by the descent of the contents of tube D, the vacuum in A, becomes so much impaired that the whole of the contents of D, do not pass below the coffee grounds, it is only necessary, in order to increase the vacuum, to raise the strainer E gently with the hand. The said strainer being packed tight, the vacuum below it will be thus increased and the contents above the coffee-grounds will then descend and leave the grounds entirely dry. This ability to increase the vacuum is a peculiar feature of my improved coffee-pot and is of great convenience in the use of this description of apparatus.

What I claim as new and desire to secure by Letters Patent is:—

The arrangement and combination of the piston-packed strainer E, cylinder D, receiving vessel A, socket H, and condenser F, as and for the purpose herein shown and described.

WM. CHESTERMAN.

Witnesses:
CILO CHESTERMAN,
LEVI STROHL.